(12) United States Patent
Huang et al.

(10) Patent No.: US 8,958,077 B2
(45) Date of Patent: Feb. 17, 2015

(54) APPARATUS FOR DETECTING POSITION AND DEPTH AND A METHOD THEREOF

(75) Inventors: Chen-Yi Huang, Taichung (TW); Te-Sheng Tseng, Taichung (TW); Wen-Hung Hsu, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 757 days.

(21) Appl. No.: 13/197,423

(22) Filed: Aug. 3, 2011

(65) Prior Publication Data

US 2012/0236293 A1 Sep. 20, 2012

(30) Foreign Application Priority Data

Mar. 15, 2011 (TW) .............................. 100108667 A (51) Int. Cl.
  *G01B 11/24* (2006.01)
  *G01B 11/22* (2006.01)
(52) U.S. Cl.
  CPC ................ *G01B 11/24* (2013.01); *G01B 11/22* (2013.01)
  USPC ........................................................ 356/601
(58) Field of Classification Search
  CPC .. G01B 11/24; G01B 11/2518; G01B 11/255; G06T 7/0051
  USPC ................................................... 356/601, 608
  See application file for complete search history.

(56) References Cited

U.S. PATENT DOCUMENTS

| | | | |
|---|---|---|---|
| 3,749,496 A * | 7/1973 | Hietanen et al. ................. | 356/73 |
| 4,158,507 A * | 6/1979 | Himmel ........................ | 356/608 |
| 4,634,879 A * | 1/1987 | Penney ......................... | 356/608 |
| 5,103,105 A * | 4/1992 | Ikegaya et al. ................. | 356/608 |
| 2002/0180987 A1* | 12/2002 | Johnston et al. .............. | 356/601 |

FOREIGN PATENT DOCUMENTS

CN 1568452 A 1/2005

* cited by examiner

*Primary Examiner* — Kara E Geisel
(74) *Attorney, Agent, or Firm* — Tim Tingkang Xia, Esq.; Morris, Manning & Martin, LLP (57) ABSTRACT

The present invention provides an apparatus for detecting the position and depth of a Device Under Test (DUT) having a surface and a method thereof. The apparatus comprises an electrically-controlled swing element whose swing angle is controlled by an electrically-driven actuator, a light source whose light beam is redirected to the surface by the electrically-controlled swing element to form a light point, an optical system configured to receive the projection information of the light point, a storage unit configured to store the default information of the light point projected onto a default plane (DP) and a computation unit for calculating the depth information of the DUT according to the projection information and the default information.

11 Claims, 5 Drawing Sheets

APPARATUS FOR DETECTING POSITION AND DEPTH AND A METHOD THEREOF

CROSS-REFERENCE TO RELATED APPLICATIONS

This non-provisional application claims priority under 35 U.S.C. §119(a) on Patent Application No. 100108667 filed in Taiwan, R.O.C. on Mar. 15, 2011, the entire contents of which are hereby incorporated by reference.

BACKGROUND OF THE INVENTION

1. Field of the Invention

The present invention relates to an apparatus for detecting position and depth and a method thereof, and more particularly to an optical apparatus for detecting position and depth and a method thereof.

2. Description of the Prior Art

Currently, the curvature of the surface of an object can be measured through a variety of methods, such as projection moiré method, interferometry, image differentiation method and laser scanning triangulation. The moiré measuring technique generally adopts the transmissive or oblique reflective measurement method to form moiré. Though the moiré measuring technique features low cost, simple configuration and high stability, the transmissive measurement method cannot be applied to measure the curvature of the surface of a non-optically transmissive object. As for the oblique reflective measurement method, the theoretical calculation adopted is complex, and there is a decrement in the energy of the reflected image, thus the measured curvature of the surface will be less accurate as a result of the low contrast of the image.

Additionally, the interferometry, image differentiation method and laser scanning triangulation not only involve complex theoretical calculations but also require complicated and expensive measurement systems and apparatuses, thus incurring high costs.

Therefore, it raises an important issue as to how to develop a simple structure for measuring the variation in the depth of the surface of an object.

SUMMARY OF THE INVENTION

The present invention relates to an apparatus for detecting position and depth and a method thereof. Such an apparatus requires simple constituent components and is capable of detecting the position and depth information of a device under test (DUT) through an uncomplicated method.

According to an aspect of the present invention, there is provided an apparatus for detecting the position and depth of a DUT having a surface, at least comprising: an electrically-controlled swing element, a light source, an optical system, a storage unit and a computation unit. The swing angle of the electrically-controlled swing element is controlled by an electrically-driven actuator. The light beam of the light source is redirected to the surface by the electrically-controlled swing element to form a light point. The optical system is configured to receive the projection information of the light point. The storage unit is configured to store the default information of the light point projected onto a default plane (DP). The computation unit calculates the depth information of the DUT according to the projection information and the default information.

According to another aspect of the present invention, there is provided a method for detecting the position and depth of a DUT having a surface, comprising the steps of: emitting a light beam through a light source; redirecting the light beam to the surface by means of the periodic swing motion of an electrically-controlled swing element so that the light beam scans the entire surface and forms a plurality of light points; receiving, through an optical system, projection information from the plurality of light points; and calculating the depth information of the DUT according to default information of the plurality of light points projected onto a DP and the projection information.

The present invention will be described more fully hereinafter with reference to the accompanying drawings, in which preferred embodiments of the present invention are shown.

DETAILED DESCRIPTION OF THE PREFERRED EMBODIMENTS

Figure 1:
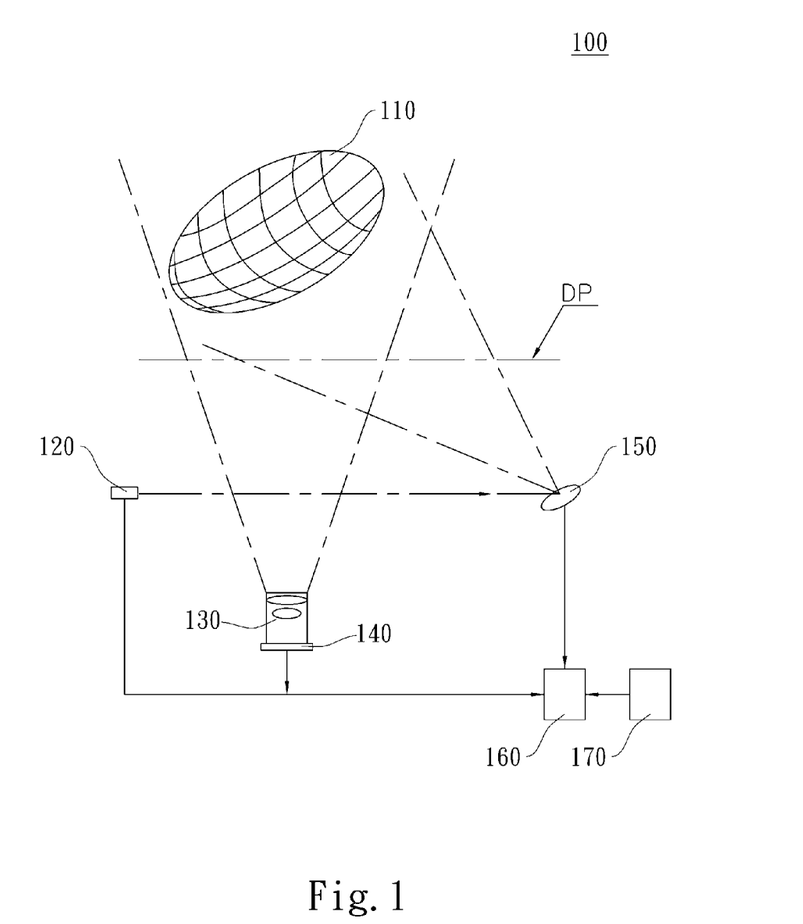
FIG. 1 is a schematic representation showing a system for detecting position and depth in accordance with an embodiment of the present invention.

FIG. 1 is a schematic representation showing a system 100 for detecting position and depth in accordance with an embodiment of the present invention. In this embodiment, the system 100 for detecting position and depth comprises a DUT 110 and an apparatus for detecting position and depth of a DUT 110 having a surface, the apparatus comprises a light source 120, an optical system 130, a photo-sensing element 140, an electrically-controlled swing element 150, a computation unit 160 and a storage unit 170. In this application, DUT is not limited to an electronic device; any device with a plane could be the DUT in this application.

The DUT 110 may be an object comprising at least one surface having an uneven surface profile. The light source 120 may be a visible or non-visible light providing a parallel light beam, e.g. a laser light beam, so that the divergence of the light beam emitted by the light source 120 will not be too large after the light beam travels for a distance. Moreover, the light point formed on the spatial plane by the light source 120 may have a circular shape or an elongated circular shape, or be arranged to be of a variable shape between a circular shape and an elongated circular shape. The light point with an adjusted circular shape is generated by using Pulse Width Modulation (PWM) or Pulse Frequency Modulation (PFM). The shape of the light point can be controlled by adjusting the swing angle of the electrically-controlled swing element 150 and the light source 120.

The optical system 130 comprises at least one lens for receiving optical information and its angle of view covers the required spatial plane. The photo-sensing element 140, e.g. a linear CMOS sensor or a linear CCD sensor, is disposed at an image side of the optical system 130 for detecting image information. In one embodiment, the optical system 130 and the photo-sensing element 140 may be embodied as a photographing lens assembly. The electrically-controlled swing element 150 swings periodically and the swing angle thereof is within a range enabling the redirected light beam to cover the required spatial plane. Moreover, the swing angle may be determined by a swing frequency or a given signal. The computation unit 160, e.g. a central microprocessor, is configured to receive data transmitted by components, such as the light source 120, and to calculate the required information based on the received data. The storage unit 170, e.g. a hard drive or a flash memory, is configured to store information.

Figure 2:
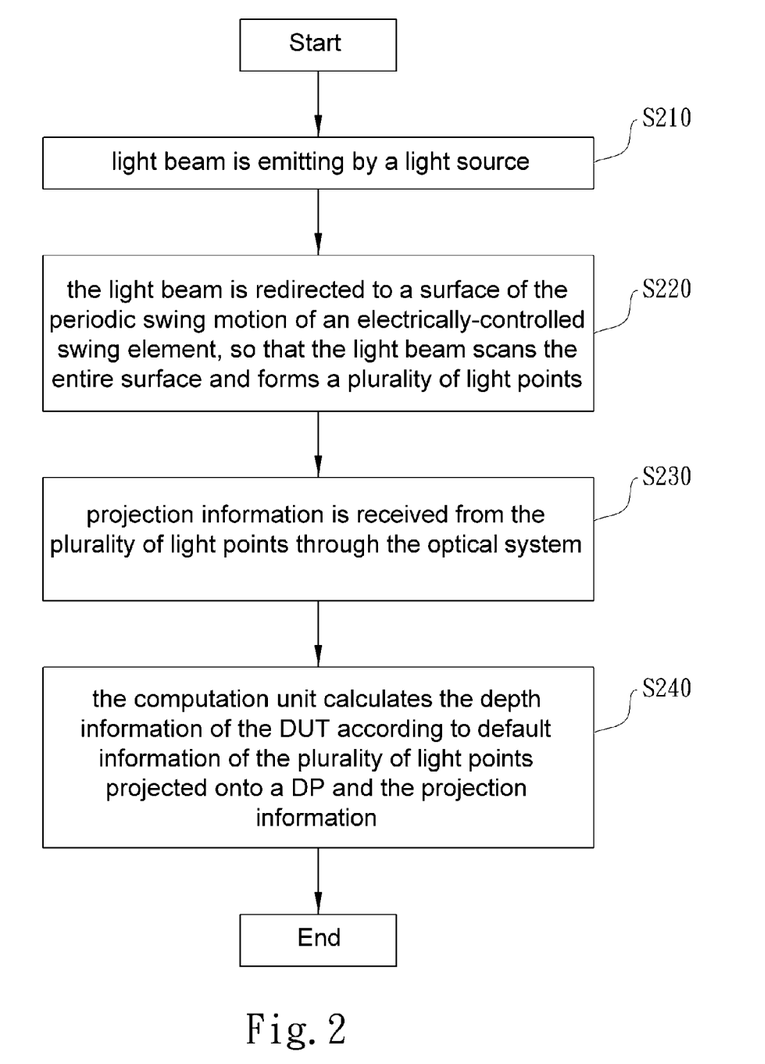
FIG. 2 is a flow chart showing a method for detecting position and depth in accordance with an embodiment of the present invention.

FIG. 2 is a flow chart showing a method for detecting the position and depth of a DUT having a surface in accordance with the aforementioned embodiment of the present invention. Please also refer to FIG. 1. In S210, a light beam is emitted through the light source 120. For example, the light source 120 can emit a light beam toward the electrically-controlled swing element 150.

In S220, the light beam is redirected to a surface of the DUT 110 by means of the periodic swing motion of the electrically-controlled swing element 150, so that the light beam scans the entire surface of the DUT 110 and forms a plurality of light points on the surface. The swing angle of the electrically-controlled swing element 150 is controlled by an electrically-driven actuator so that the electrically-controlled swing element 150 can swing reciprocatingly and enables the redirected light beam to cover the entire surface of the DUT 110. In addition, the light beam of the light source 120 is redirected to the surface of the DUT 110 by the electrically-controlled swing element 150 to form a plurality of light points on the surface.

In S230, projection information is received from the plurality of light points through the optical system 130. For example, the periodic swing motion of the electrically-controlled swing element 150 enables the light beam emitted by the light source 120 to form a plurality of light points on the surface of the DUT 110 at different time periods, and the optical system 130 receives projection information from the plurality of light points at the different time periods, respectively. For example, only one light point is projected onto the surface of the DUT 110 when the electrically-controlled swing element 150 swings to a particular angle at a specific time period, and meanwhile the optical system 130 receives the image information of the light point.

In S240, the computation unit 160 calculates the depth information of the surface of the DUT 110 according to default information of the plurality of light points projected onto a DP and the projection information. For example, the light beam emitted by the light source 120 is redirected to a DP by the electrically-controlled swing element 150 to form a plurality of light points on the DP before being projected onto the DUT 110, and the optical system 130 receives information from the plurality of light points formed on the DP and stores the information as default information in the storage unit 170. That is, the storage unit 170 stores the default information of the plurality of light points projected onto the DP. The computation unit 160 calculates the depth information and axial position of the surface of the DUT 110 according to the projection information and the default information, wherein the depth information may be information on the variation in the depth of the surface. Accordingly, the computation unit 160 can utilize the depth information and axial position of a specific light point on the surface of the DUT 110 to calculate the two-dimensional position of the specific light point. As the electrically-controlled swing element 150 swings reciprocatingly and enables the redirected light beam to cover the surface of the DUT 110, the respective depth information and axial positions of all the light points on the surface of the DUT 110, after being calculated, can be organized to obtain the two-dimensional information of the surface of the DUT 110, that is, the two-dimensional position of the DUT 110 can be calculated.

The following paragraphs will detail how the depth information is calculated according to the projection information and default information.

Figure 3:
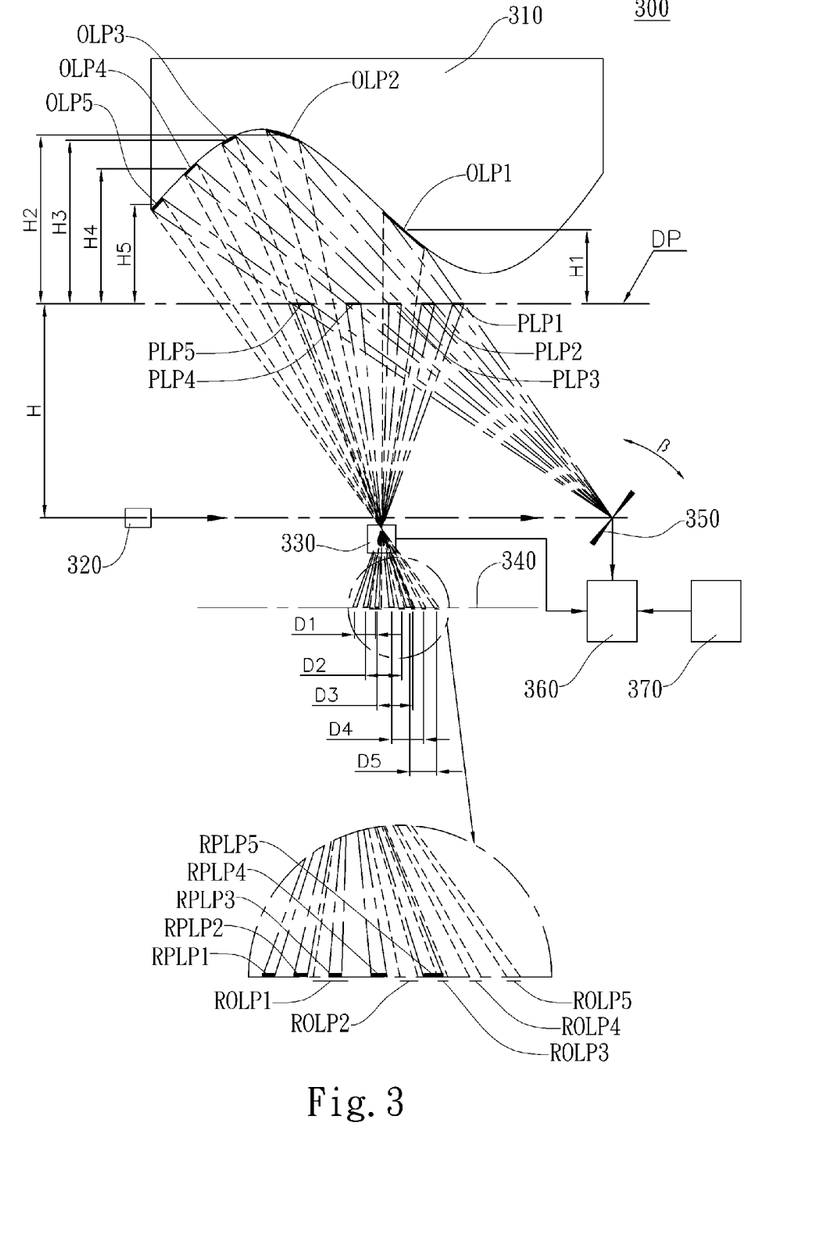
FIG. 3 is a schematic representation of a system for detecting position and depth that calculates the depth information according to the center displacement of a light point in accordance with an embodiment of the present invention.

FIG. 3 is a schematic representation of a system 300 for detecting position and depth that calculates the depth information according to the center displacement of a light point in accordance with an embodiment of the present invention. In this embodiment, the DUT 310, the light source 320, the optical system 330, the photo-sensing element 340, the electrically-controlled swing element 350, the computation unit 360 and the storage unit 370 are similar to the DUT 110, the light source 120, the optical system 130, the photo-sensing element 140, the electrically-controlled swing element 150, the computation unit 160 and the storage unit 170 illustrated in FIG. 1, thus no further discussion will be made here. $\beta$ is an angle within which the electrically-controlled swing element 150 may swing.

When the electrically-controlled swing element 350 swings to a particular angle, the light point projected onto a DP and a surface of the DUT 310 by the light beam is designated, respectively, as the Plane Light Point (PLP) and the Object Light Point (OLP). For example, when the electrically-controlled swing element 350 swings to a first angle, the light point projected onto the DP and the surface of the DUT 310 is designated, respectively, as the PLP1 and the OLP1, and the optical system 330 receives respective information of the PLP1 and OLP1 and forms the Redirection PLP (RPLP1) and the Redirection OLP (ROLP1) on the photo-sensing element 340, thereby generating the default information of the RPLP1 corresponding to the PLP1 and the projection information of the ROLP1 corresponding to the OLP1, respectively. The distance between the centers of the ROLP1 and the RPLP1 (i.e. the center displacement of the light point) is D1.

As the DP is known, the default information of the RPLP1 formed on the photo-sensing element 340 is pre-stored in the storage unit 370, and the computation unit 360 can calculate the depth information of the DUT according to a center displacement of the light point derived from the default information and projection information. For example, when the angle to which the electrically-controlled swing element 350 swings is fixed, the greater the distance between the centers of the ROLP1 and the RPLP1 (i.e. the center displacement of the light point) is, the farther is the distance between the OLP1 and the PLP1, which denote the light point projected respectively onto the DUT 310 and the DP by the light beam, thereby the distance H1 between the OLP1 on the surface of the DUT 310 and the DP can be calculated by the computation unit 360.

Similarly, when the electrically-controlled swing element 350 swings to the second angle, the third angle, the fourth angle and the fifth angle, the light points projected onto the DP and the surface of the DUT 310 are designated, respectively, as PLP2~PLP5 and OLP2~OLP5. The optical system 330 receives respective information of PLP2~PLP5 and OLP2~OLP5 and forms RPLP2~RPLP5 and ROLP2~ROLP5 on the photo-sensing element 340, thereby generating the default information of the RPLP2~RPLP5 corresponding to PLP2~PLP5 and the projection information of ROLP2~ROLP5 corresponding to OLP2~OLP5. The distances between the centers of ROLP2~ROLP5 and those of RPLP2~RPLP5 are D2~D5, respectively. As the light beam emitted by the light source 320 is very narrow and the swing angle of the electrically-controlled swing element 350 can be precisely controlled, the inaccuracy of the depth information calculated according to the center displacement of a light point is acceptable. As the light beam emitted by the light source 320 covers the entire surface of the DUT 310, the computation unit 360 can calculate the variation in the depth of a surface of the DUT 310, thereby obtaining the depth information of the DUT 310.

In another embodiment, the depth information of the DUT can be calculated according to the variation in shape of a light point.

Figure 4:
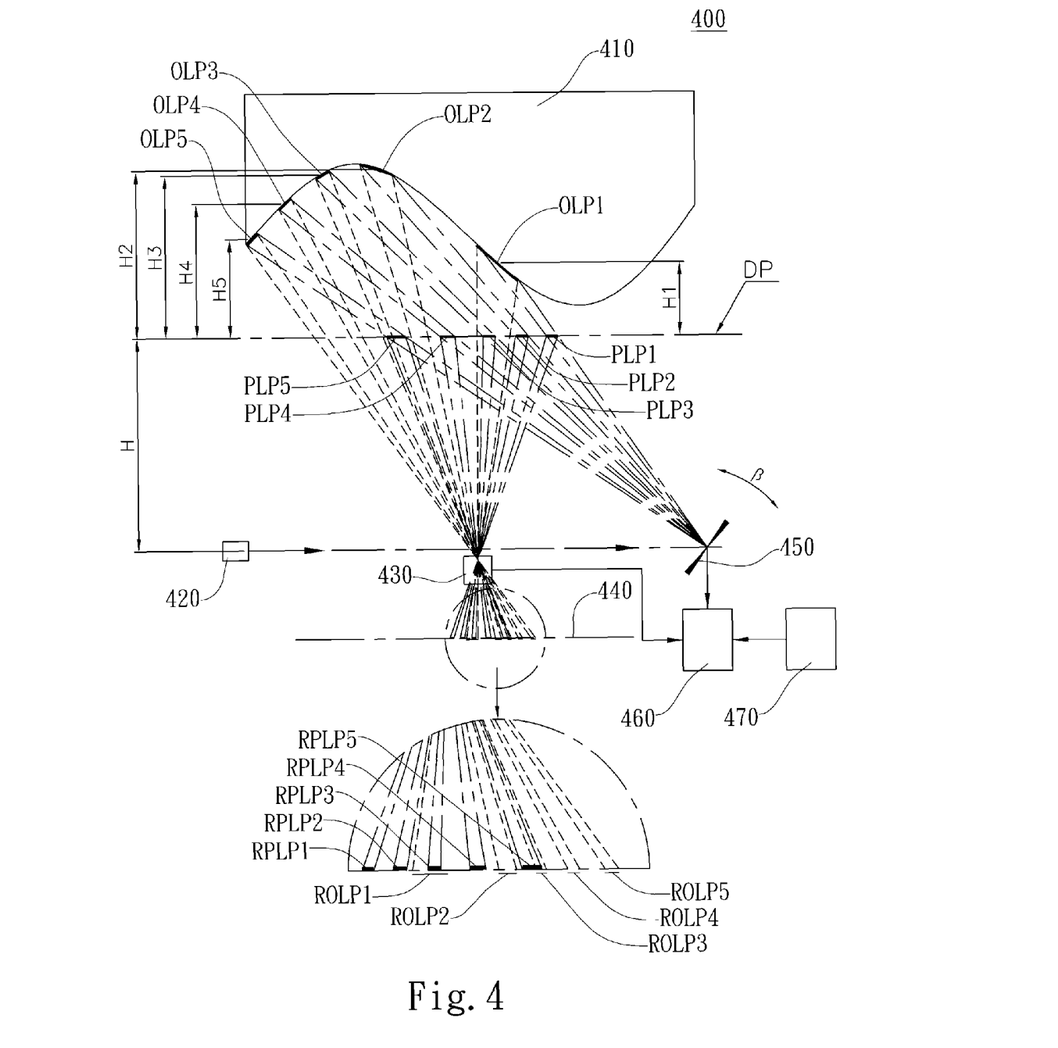
FIG. 4 is a schematic representation of a system for detecting position and depth that calculates the depth information according to the variation in shape of a light point in accordance with an embodiment of the present invention.

FIG. 4 is a schematic representation of a system 400 for detecting position and depth that calculates the depth information according to the variation in shape of a light point in accordance with an embodiment of the present invention. In this embodiment, the DUT 410, the light source 420, the optical system 430, the photo-sensing element 440, the electrically-controlled swing element 450, the computation unit 460, the storage unit 470, OLP1~OLP5, PLP1~PLP5, ROLP1~ROLP5, RPLP1~RPLP5 and H1~H5 are similar to the DUT 310, the light source 320, the optical system 330, the photo-sensing element 340, the electrically-controlled swing element 350, the computation unit 360, the storage unit 370, OLP1~OLP5, PLP1~PLP5, ROLP1~ROLP5, RPLP1~RPLP5 and H1~H5 illustrated in FIG. 3, thus no further discussion will be made here.

As the DP is known, the default information of the RPLP1 formed on the photo-sensing element 440 is pre-stored in the storage unit 470, and the computation unit 460 calculates the depth information of the DUT 410 according to the variation in shape of the light point derived from the default information of the RPLP1 and the projection information of the ROLP1. For example, as the angle to which the electrically-controlled swing element 450 swings is fixed, the greater the variation in shape (e.g. the greater the difference in size) between the ROLP1 and the RPLP1 is, the farther is the distance between the OLP1 and the PLP1, which denote the light point projected respectively onto the DUT 410 and the DP by the light beam. Accordingly, the computation unit 460 can calculate the distance H1 between the OLP1 on the surface of the DUT 410 and the DP.

Similarly, when the electrically-controlled swing element 450 swings to the second angle, the third angle, the fourth angle and the fifth angle, the light points projected onto the DP and the DUT 410 are designated as PLP2~PLP5 and OLP2~OLP5, respectively, and the optical system 430 receives respective information of PLP2~PLP5 and OLP2~OLP5 and forms RPLP2~RPLP5 and ROLP2~ROLP5 on the photo-sensing element 440, thereby generating the default information of RPLP2~RPLP5 corresponding to PLP2~PLP5 and the projection information of ROLP2~ROLP5 corresponding to OLP2~OLP5. The computation unit 460 calculates the distances H2~H5 between respective OLP2~OLP5 and the DP according to the variation in shape of respective light points derived from the projection information of ROLP2~ROLP5 and default information of RPLP2~RPLP5. Accordingly, the computation unit 460 can calculate the variation in the depth of a surface of the DUT 410, thereby obtaining the depth information of the DUT 410.

In another embodiment, the depth information of the DUT can be calculated according to the variation in intensity at the center of a light point.

Figure 5:
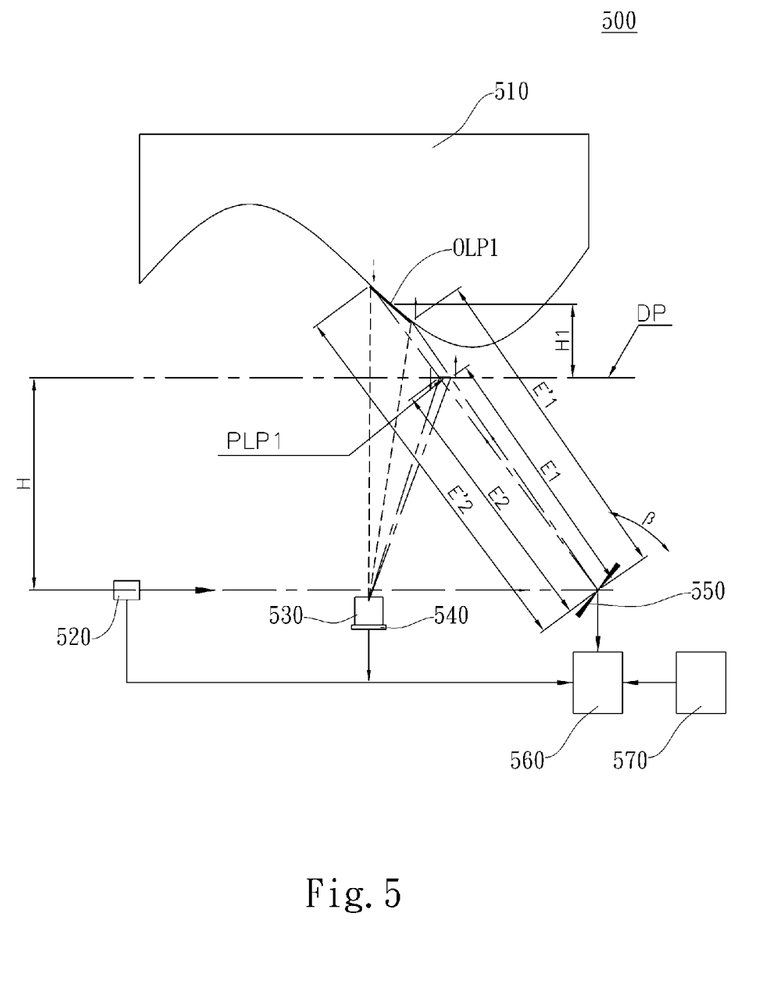
FIG. 5 is a schematic representation of a system for detecting position and depth that calculates the depth information according to the variation in intensity at the center of a light point in accordance with an embodiment of the present invention.

FIG. 5 is a schematic representation of a system 500 for detecting position and depth that calculates the depth information according to the variation in intensity at each center of the light points derived from the default information and the projection information in accordance with an embodiment of the present invention. In this embodiment, the DUT 510, the light source 520, the optical system 530, the photo-sensing element 540, the electrically-controlled swing element 550, the computation unit 560, the storage unit 570, the OLP1 and the PLP1 are similar to the DUT 310, the light source 320, the optical system 330, the photo-sensing element 340, the electrically-controlled swing element 350, the computation unit 360, the storage unit 370, the OLP1 and the PLP1 illustrated in FIG. 3, thus no further discussion will be made here.

When the electrically-controlled swing element 550 swings to a particular angle, the light point projected onto the surface of the DUT 510 and the DP is designated, respectively, as the OLP1 and the PLP1. E1 and E2 denote respective intensities at the right and left sides of the PLP1 on the DP while E1' and E2' denote respective intensities at the right and left sides of the OLP1 on the DUT 510.

As the DP is known, the default information of the intensities E1 and E2 of the PLP1 on the DP detected by the photo-sensing element 540 is pre-stored in the storage unit 570. When the photo-sensing element 540 detects the projection information of the intensities E1' and E2' of the OLP1 on the surface of the DUT 510, the computation unit 560 can calculate the depth information of the light point according to the variation in intensity at each center of the light points derived from the default information of E1 and E2 and the projection information of E1' and E2'. For example, the intensity at the center of the PLP1 on the DP is an average of E1 and E2 while the intensity at the center of the OLP1 on the surface of the DUT 510 is an average of E1' and E2'. The variation in intensity at the center of the light point is the difference between the average of E1 and E2 and the average of E1' and E2'. As the intensity of the light beam is in inverse proportion to the length of the path along which the light beam travels (i.e. the longer the light beam travels, the lower the intensity of the light beam), the greater the variation in intensity at the center of the light point is, the farther is the distance between the OLP1, which denotes the light point projected onto the surface of the DUT 510, and the DP, thereby the computation unit 560 can calculate the distance H1 between the OLP1 on the surface of the DUT 510 and the DP.

While the depth information of the DUT can be calculated using the center displacement of the light point, the variation in shape of the light point and the variation in intensity at the center of the light point, respectively, the present invention is not limited thereto. For example, the computation unit can calculate the depth information of the DUT according to the variation in shape of the light point and the variation in intensity at each center of the light points derived from the default information and the projection information. Under some circumstances where the surface has an uneven surface profile, the depth information calculated using the variation in shape of the light point is more accurate than the depth information calculated using the variation in intensity at each center of the light points. However, under other circumstances where the surface has an uneven surface profile, the depth information calculated using the variation in shape of the light point is less accurate than the depth information calculated using the variation in intensity at the center of the light point. Therefore, the accuracy of the calculated depth information can be increased by combining the two calculation methods by way of, for example, calculating the average of the results obtained through the two calculation methods. In addition, the present invention is not limited to the combination of the aforementioned two calculation methods. The use of all or a combination of any two of the three aforementioned calculation methods utilizing "the center displacement of the light point", "the variation in shape of the light point" and "the variation in intensity at each center of the light points" to calculate the depth information and the apparatuses thereof falls within the scope of the present invention.

As the depth information of the surface of the DUT can be calculated by the computation unit, the act of redirecting the light beam of the light source at the same angle through the electrically-controlled swing element and the projection information received by the optical system at the aforementioned different time points enable the computation unit to further calculate the amount of movement of the DUT. That is, the amount of movement of the DUT can be inferred by measuring the depth information of the DUT. As the amount of movement of the DUT can be inferred with a simple element configuration, the apparatus has a wider range of application.

Moreover, the light point formed on the spatial plane may have a circular shape or an elongated circular shape, or be arranged to be of a variable shape between a circular shape and an elongated circular shape, so as to increase the accuracy of the depth information of the surface of the DUT calculated by the computation unit.

Consequently, the present invention requires merely a photo-sensing element to calculate the variation in the depth of the surface of the DUT. That is, the present invention requires fewer elements and a simpler configuration to calculate the variation in the depth of the surface of the DUT. Therefore, the present invention can reduce the image processing time due to simple image recognition processing. Additionally, the structure of the present invention is simple, thus the manufacturing cost is lower.

While this invention has been described by way of examples and in terms of preferred embodiments, it is to be understood that this invention is not limited hereto. A person having ordinary skill in the art can make various changes and alterations herein without departing from the spirit and scope of this invention. Therefore, the scope of protection of the present invention is defined by the appended claims.

What is claimed is:

1. An apparatus for detecting the position and depth of a device under test (DUT) having a surface comprising:
    an electrically-controlled swing element whose swing angle is controlled by an electrically-driven actuator;
    a light source whose light beam is redirected to the surface by the electrically-controlled swing element to form a light point;
    an optical system configured to receive projection information of the light point;
    a storage unit configured to store default information of the light point projected onto a default plane (DP); and
    a computation unit for calculating depth information of the DUT according to the projection information and the default information, wherein the depth information of the DUT is defined based on a variation in shape of the light point and a variation in intensity at a center of the light point derived from the default information and the projection information.

2. The apparatus for detecting the position and depth of a DUT having a surface according to claim 1, wherein the electrically-controlled swing element swings periodically and the swing angle thereof can be determined by a swing frequency or a given signal.

3. The apparatus for detecting the position and depth of a DUT having a surface according to claim 1, wherein the swing angle of the electrically-controlled swing element is within a range enabling the redirected light beam to cover a required spatial plane.

4. The apparatus for detecting the position and depth of a DUT having a surface according to claim 1, wherein the optical system has an angle of view covering a required spatial plane.

5. The apparatus for detecting the position and depth of a DUT having a surface according to claim 1, wherein the optical system comprises at least one lens.

6. The apparatus for detecting the position and depth of a DUT having a surface according to claim 1, wherein the light point formed on a spatial plane by the light source has a circular shape.

7. The apparatus for detecting the position and depth of a DUT having a surface according to claim 1, wherein the light point formed on a spatial plane by the light source has an elongated circular shape.

8. The apparatus for detecting the position and depth of a DUT having a surface according to claim 1, wherein the light point formed on a spatial plane by the light source is arranged to be of a variable shape between a circular shape and an elongated circular shape, and the shape of the light point can be controlled by adjusting the swing angle of the electrically-controlled swing element and the light source.

9. An apparatus for detecting the position and depth of a device under test (DUT) having a surface comprising:
    an electrically-controlled swing element whose swing angle is controlled by an electrically-driven actuator;
    a light source whose light beam is redirected to the surface by the electrically-controlled swing element to form a light point;
    an optical system configured to receive projection information of the light point;
    a storage unit configured to store default information of the light point projected onto a default plane (DP); and
    a computation unit for calculating depth information of the DUT according to the projection information and the default information,
    wherein the light point formed on a spatial plane by the light source is arranged to be of a variable shape between a circular shape and an elongated circular shape, and the shape of the light point can be controlled by adjusting the swing angle of the electrically-controlled swing element and the light source,
    wherein the light point with an adjusted circular shape is generated by using Pulse Width Modulation (PWM) or Pulse Frequency Modulation (PFM).

10. A method for detecting the position and depth of a device under test (DUT) having a surface, comprising:
    emitting a light beam by a light source;
    redirecting the light beam to a default plane (DP) and the surface through periodic swing motion of an electrically-controlled swing element so that the light beam forms a first plurality of light points on the DP, scans the entire surface and forms a second plurality of light points on the surface;
    receiving projection information from the second plurality of light points through an optical system; and
    calculating depth information of the DUT according to default information of the first plurality of light points projected onto the DP and the projection information, wherein calculating the depth information of the DUT further comprises calculating variation in shape of the second plurality of light points and variation in intensity at each center of the second plurality of light points derived from the default information and the projection information.

11. The method for detecting the position and depth of a DUT having a surface according to claim 10, wherein an amount of movement of the DUT is calculated by means of redirecting the light beam at a same angle through the electrically-controlled swing element and receiving the projection information from the optical system at different time periods.

* * * * *